(12) United States Patent
Mulderij (10) Patent No.: US 10,287,831 B2
(45) Date of Patent: May 14, 2019

(54) LIFTING DEVICE FOR PICKING UP A MEMBER FROM THE BOTTOM OF THE SEA

(71) Applicant: IHC Holland IE B.V., Sliedrecht (NL)

(72) Inventor: Klaas-Jan Mulderij, Delft (NL)

(73) Assignee: IHC Holland IE B.V., Sliedrecht (NL)

( * ) Notice: Subject to any disclaimer, the term of this patent is extended or adjusted under 35 U.S.C. 154(b) by 0 days.

(21) Appl. No.: 15/745,733

(22) PCT Filed: Jul. 21, 2016

(86) PCT No.: PCT/EP2016/067373
§ 371 (c)(1),
(2) Date: Jan. 18, 2018

(87) PCT Pub. No.: WO2017/013197
PCT Pub. Date: Jan. 26, 2017

(65) Prior Publication Data
US 2018/0209225 A1 Jul. 26, 2018

(30) Foreign Application Priority Data

Jul. 23, 2015 (NL) ...................................... 2015214

(51) Int. Cl.
*E21B 19/06* (2006.01)
*E21B 31/20* (2006.01)
*E21B 41/00* (2006.01)
*F16F 9/02* (2006.01)

(52) U.S. Cl.
CPC .............. *E21B 19/06* (2013.01); *E21B 31/20* (2013.01); *E21B 41/0007* (2013.01); *F16F 9/0218* (2013.01)

(58) Field of Classification Search
CPC .......... E21B 19/06; B63B 22/08; B63B 21/08
USPC .................... 294/66.1, 93, 97, 82.34, 202
See application file for complete search history.

(56) References Cited

U.S. PATENT DOCUMENTS

| | | | | |
|---|---|---|---|---|
| 3,169,591 A | * | 2/1965 | Worthington | E21B 7/20 175/257 |
| 3,628,821 A | * | 12/1971 | Reece | B66C 1/66 294/66.1 |
| 3,827,258 A | * | 8/1974 | Kammerer, Jr. | B63B 21/26 166/214 |
| 4,459,931 A | | 7/1984 | Glidden | |
| 4,736,978 A | * | 4/1988 | Cielker | H02G 1/083 254/134.3 FT |

(Continued)

FOREIGN PATENT DOCUMENTS

| | | |
|---|---|---|
| EP | 85154 A1 | 8/1983 |
| EP | 0257943 A2 | 3/1988 |

(Continued)

*Primary Examiner* — Paul T Chin
(74) *Attorney, Agent, or Firm* — N.V. Nederlandsch Octrooibureau; Catherine A. Shultz; Tamara C. Stegmann (57) ABSTRACT

The invention relates to a lifting device for picking up a member from the bottom of the sea, the lifting device comprising;
a body extending along a central axis of the lifting device and having means for connection to a hoist cable,
a housing configured to be at least partially introduced into a cavity of the member to be picked up and accommodating at least a part of the body and wherein the body and the housing are moveable with respect to each other along the central axis of the lifting device.

17 Claims, 6 Drawing Sheets

(56) References Cited

U.S. PATENT DOCUMENTS

| | | | | |
|---|---|---|---|---|
| 5,236,239 | A | * | 8/1993 | Govang .................. B01L 9/00 294/115 |
| 2002/0084660 | A1 | * | 7/2002 | Webber .................. B66C 1/54 294/97 |
| 2005/0200145 | A1 | * | 9/2005 | Morin ..................... B65G 7/12 294/97 |
| 2009/0151951 | A1 | | 6/2009 | Erkol et al. |
| 2010/0213728 | A1 | * | 8/2010 | Hoellriegl ............. B65G 47/90 294/87.1 |
| 2015/0357062 | A1 | * | 12/2015 | Allison .................. B66C 1/54 294/195 |

FOREIGN PATENT DOCUMENTS

| | | | |
|---|---|---|---|
| GB | 1577778 | A | 10/1980 |
| GB | 2201709 | A | 9/1988 |
| WO | 2002064994 | A1 | 8/2002 |
| WO | 2006116870 | A1 | 11/2006 |

\* cited by examiner

LIFTING DEVICE FOR PICKING UP A MEMBER FROM THE BOTTOM OF THE SEA

BACKGROUND

The present invention relates to a lifting device for picking up a member from the bottom of the sea, the lifting device comprising a body, a housing and an engagement member coupled with the body and the housing such that the engagement member is moveably arranged to move in a radial direction with respect to the central axis. An example of this type of lifting device of the present invention is referred to as to internal lifting tool in the field.

Such a lifting device is known from GB1577778 which relates to lifting devices for tubular piles. GB1577778 provides a pipe lifting device having a plurality of latches movably mounted on the body and moveable between retracted positions and extended positions in which the latches project laterally of the body. The latches can be operated by a weight means and a drawing line.

Incorporating a free weight in the lifting device complicates the design and a drawing line is cumbersome in use during operations at the bottom of the sea.

Offshore lifting devices frequently put objects down on the seabed and pick these objects from the seabed later. Many times it is desirable that no connection between the lifting device and the vessel is maintained during the time that the object is down on the seabed. It is then required to make connection again with the object for lifting the object off the seabed. There are already different ways of doing this such as connect slings around trunnions, connect a shackle to the object or lower an internal lifting tool into a piece of pipe on the object. Such an Internal Lifting Tool (ILT) needs to be connected hydraulically to a powerpack to be activated. In most cases this is a powerpack on the vessel, but it can also be a subsea powerpack or a set of hydraulic accumulators. At all times this complicates the use of an ILT.

EP 0257943 relates to an apparatus for use in energy exploration and includes a support tubular member for connection to a drilling string, and a radially movable member to pass through tubular obstructions.

SUMMARY OF THE INVENTION

The invention aims to provide a lifting device which does not need an hydraulic connection when picking up an object from the seabed.

Another object of the invention is to improve a lifting device in that a problem associated therewith is at least partially solved.

Yet another object of the invention is to provide an alternative lifting device.

According to a first aspect of the invention this is realized with a lifting device for picking up a member from the bottom of the sea, the lifting device comprising;
- a body extending along a central axis of the lifting device and having means for connection to a hoist cable,
- a housing configured to be at least partially introduced into a cavity of the member to be picked up and accommodating at least a part of the body and wherein the body and the housing are moveable with respect to each other along the central axis of the lifting device,
- an engagement member, coupled with the body and the housing such that the engagement member is moveably arranged to move in a radial direction with respect to the central axis upon movement of the body and the housing with respect to each other, wherein the engagement member is moveable between a radially outward position wherein at least a part of the engagement member extends outside the housing for contacting the member to be picked up, and a radially inward position wherein the engagement member is substantially accommodated within the housing such that the lifting device can be introduced in a cavity of the member to be picked up, and
- a gas spring device coupled with the body and the housing for biasing the engagement member towards its radially outward position.

The body and the housing being moveable with respect to each other provides the possibility driving the engagement member with an external force, that is a force applied to the exterior of the housing. Thus, a direct force on the engagement member may drive the engagement member, which is the case during use of the lifting device, but the engagement member may also be driven indirectly by an external force through the housing and body.

Such an external force can be applied to the body and housing by the object to be picked up when the lifting device rests on the object to be picked up. In contrast known lifting devices drive engagement members directly by an internal force generated by an internal actuator, typically an hydraulic cylinder.

In an embodiment of the invention, the lifting device comprises cooperating guiding means for guiding the radial movement of the engagement member, and wherein the engagement member is coupled with the body and the housing and moveably arranged through said cooperating guiding means.

The cooperating guiding means constrain the movement of the engagement member with respect to the mutual movement of the housing and the body.

In an embodiment of the invention, the cooperating guiding means comprise cooperating bevelled faces to move the engagement member by wedging action upon movement of the body and the housing with respect to each other.

In an embodiment of the invention, the cooperating guiding means comprise a guide slot and a guide pin engaging the guide slot.

In an embodiment of the invention the guide slot is provided with the engagement member and the guide pin is provided with the housing.

In an embodiment of the invention, the cooperating guiding means comprise a guiding surface provided with the housing for guiding the engagement member when the engagement member moves between the radially outward position and the radially inward position.

In an embodiment of the invention, the engagement member is hingeably coupled with the body.

In an embodiment of the invention, the lifting device comprises a plurality of engagement members arranged around the central axis for distributing a lifting force $F_L$ over a circumference of the lifting device.

In an embodiment of the invention, the gas spring device comprises a cylinder system having a spring pressure chamber containing a compressible fluid, like compressed nitrogen for biasing the engagement member towards its radially outward position. Biasing is in other words pretensioning. Preferably, the spring pressure chamber is arranged at a full bore side of the cylinder system.

Alternatively the nitrogen can be replaced by hydraulic fluid. In that case the gas spring device comprises a hydraulic accumulator in fluid connection with the hydraulic fluid in the spring pressure chamber. This accumulator will store the hydraulic fluid that is pushed out of the cylinder either by external force on the housing and/or body, or by retracting the cylinder hydraulically. Inside the accumulator nitrogen is compressed again which will in that case act as the gas spring.

In an embodiment of the invention, the gas spring device comprises a floating piston at an annular side of the cylinder system which floating piston delimits the spring pressure chamber, and a leaking piston facing the full bore side of the cylinder system, wherein the leaking piston is coupled with a cylinder rod. This enables to have different characteristics for the lifting device with respect to internal operation of the engagement member and external operation of the engagement member. This enables to move the engagement members by an external force and/or an internal force while maintaining biasing the engagement member towards its radially outward position. The external force is applied through the housing and body. The internal force is generated through the gas spring device.

In an embodiment of the invention, the leaking piston comprises a through hole for allowing fluid to flow past the leaking piston. This provides more controlled characteristics with respect to external operation of the engagement member.

In an embodiment of the invention, the leaking piston and the floating piston are configured such that when the floating piston contacts the leaking piston, the floating piston closes off the through hole. This provides controlled characteristics with respect to internal operation of the engagement member.

In an embodiment of the invention, the cylinder system comprises a further pressure chamber opposite the spring pressure chamber, which further pressure chamber contains an hydraulic fluid for retracting the cylinder rod when pressurizing the hydraulic fluid. This enables to operate the engagement member internally. It is noted that upon pressurizing the hydraulic fluid the floating piston moves towards the leaking piston or moves in unity with the leaking piston. The leaking piston may already start moving before the floating piston contacts the leaking piston.

The floating piston, leaking piston and further pressure chamber together enable to provide spring action at the engagement member and active operation of the engagement member while keeping the required hydraulic system simple.

In an embodiment of the invention, the cylinder system is integrated in the body. This provides a compact lifting device with a lower part count.

In an embodiment of the invention, the body and the housing are moveable with respect to each other along the central axis of the lifting device along a housing range of motion and the cylinder rod is provided with a stop for defining an end of the housing range of movement.

The invention is beneficial for different types of lifting devices like a flange lifting tool, an internal lifting tool and an external lifting tool. The engagement member of the flange lifting tool engages a flange of the pipe to provide a form closed connection between the pipe and the lifting device which results in a quick connection. The engagement member of the internal and external lifting tool engages the wall of the pipe by friction to build a frictional connection between the pipe and the lifting device.

It is conceivable that in case of an external lifting tool, the gas spring device comprises a number of cylinder systems which enables that a respective engagement member is associated with a respective cylinder system. These number of cylinder systems may extend outside the housing.

According to a further aspect of the invention, a device is provided comprising one or more of the characterising features described in the description and/or shown in the attached drawings.

According to a further aspect of the invention a method is provided comprising one or more of the characterising features described in the description and/or shown in the attached drawings.

The various aspects discussed in this patent can be combined in order to provide additional advantageous advantages.

DESCRIPTION OF THE DRAWINGS

The invention will be further elucidated referring to a preferred embodiment shown in the drawings wherein shown in.

DETAILED DESCRIPTION OF EMBODIMENTS

Figure 1:
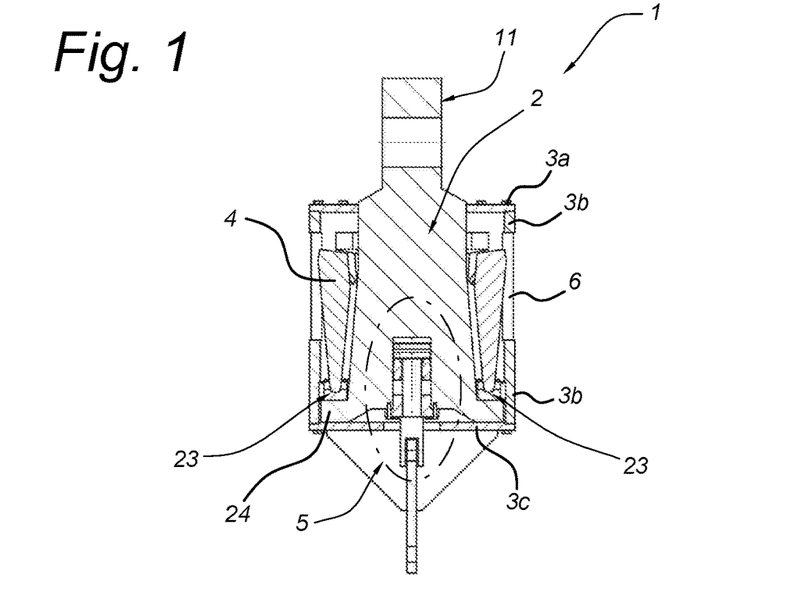
FIG. 1 in cross sectional side view an embodiment of the lifting device according to the invention.
Figure 2:
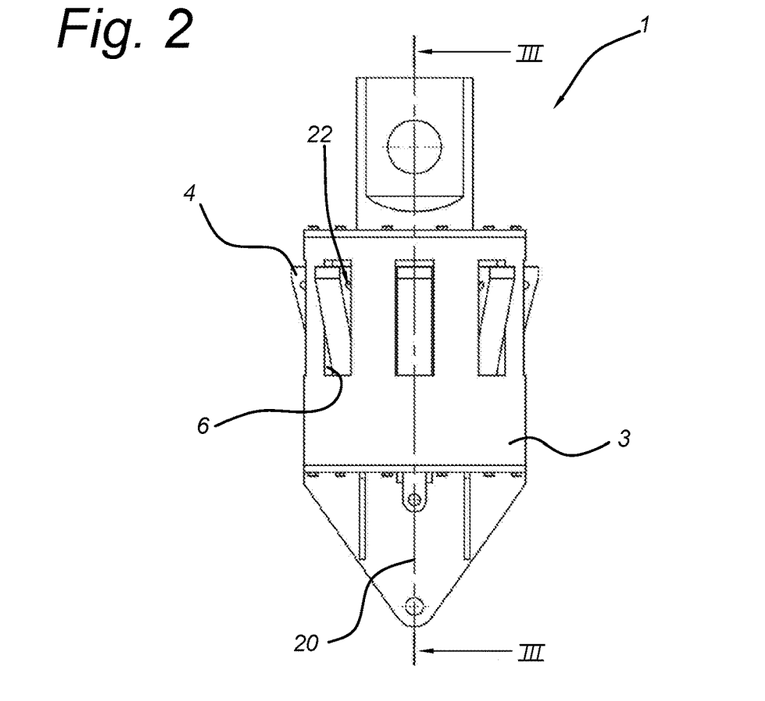
FIG. 2 a side view of the lifting device according to FIG. 1.
Figure 3:
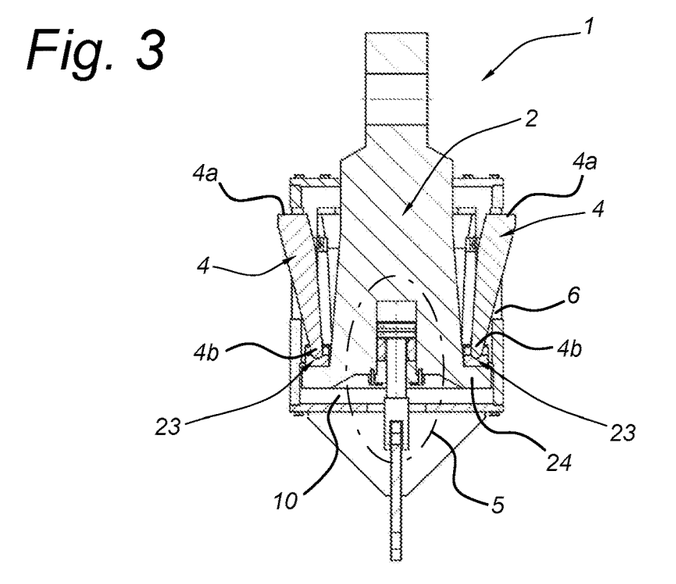
FIG. 3 the view of FIG. 1 with the engagement members in its radially outward position.

In the FIGS. 1-3 an embodiment of the lifting device 1 according to the invention is shown.

The lifting device 1 is suitable for picking up a member 7 from the bottom of the sea.

The lifting device 1 comprises a central body 2. The central body 2 extending along a central axis 20 of the lifting device 1. The central body is at its trailing end provided with a means 11 for connection to a hoist cable which is not shown. Here, the central body 2 is massive however it may also be constructed from plate material.

The lifting device 1 comprises a housing 3. The housing 3 is configured to be introduced into a cavity 21 of the member 7 to be picked up. The housing 3 accommodates a major part of the body 2. Here, the housing 3 is formed by a cylindrical housing portion 3b, a top lid 3a and a housing bottom 3c. The body 2 extends through the top lid 3a.

The body 2 and the housing 3 are moveable arranged with respect to each other along the central axis 20 of the lifting device 1.

The lifting device 1 comprises an engagement member 4. The engagement member 4 is coupled with the body 2 and the housing 3 in such a way that the engagement member 4 is moveably arranged and moves when the housing 3 and the body 2 move with respect to each other. The engagement member 4 is moveable in a radial direction with respect to the central axis 20.

The engagement member 4 is driven to move in a radial direction in two different ways. Firstly, a direct force F on the engagement member may drive the engagement member 4, which is the case during use of the lifting device 1. Secondly, the engagement member 4 may also be driven indirectly by an indirect force applied to the engagement member 4 through the housing 3 and the body 2. Such an indirect force may be applied to the housing 3 and the body 3 from the interior of the lifting device 1 by a gas spring device 5 that is described below. It is also conceivable that such an indirect force may be applied to the housing 3 and the body 3 from the exterior of the lifting device 1.

The engagement member 4 moves upon movement of the body 2 and the housing 3 with respect to each other. The engagement member 4 is moveably between a radially outward position shown in FIGS. 2 and 3 wherein at least a part of the engagement member 4 extends outside the housing 3 for contacting the member 7 to be picked up, and a radially inward position shown in FIG. 1 wherein the engagement member 4 is substantially accommodated within the housing 3 such that the lifting device 1 can be introduced in a cavity 21 of the member 7 to be picked up.

The body 2 and the engagement member 4 comprise cooperating bevelled faces 25a, 25b to move the engagement member 4 by wedging action upon movement of the body 2 and the housing 3 with respect to each other.

Figure 6A:
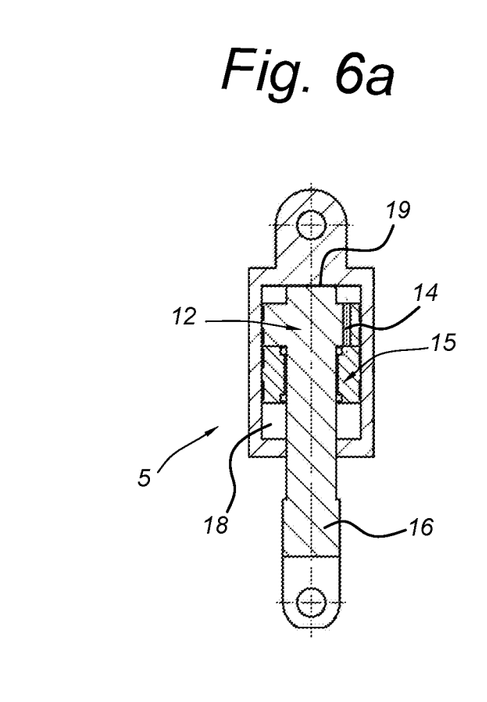
FIG. 6a-c a side view of another embodiment of a gas spring device of the lifting device of FIG. 1 in different positions.
Figure 6B:
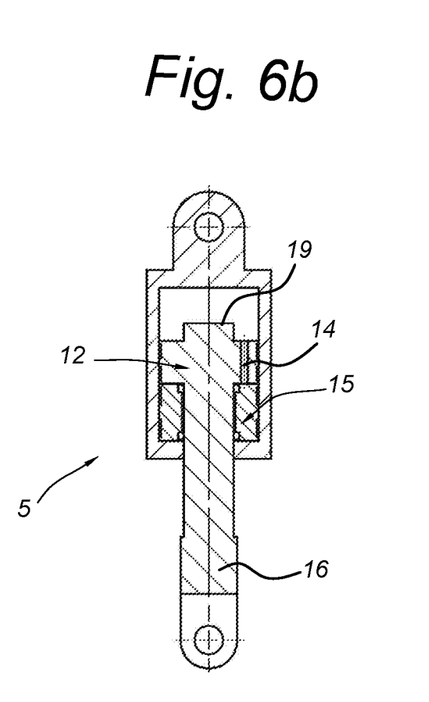
Figure 6C:
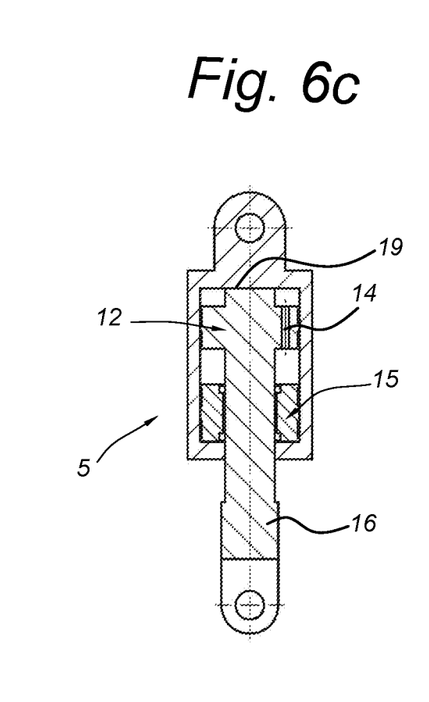

The body 2 and the housing 3 are moveable with respect to each other along the central axis 20 of the lifting device 1 along a housing 3 range of motion. Here, the cylinder rod 16 is provided with a stop 19 for defining an end of the housing 3 range of movement as shown in FIG. 6a-6c.

In this case, the engagement member 4 is hingeably coupled with the body 2. The engagement member 4 is hingeably coupled with the body 2 at one end 4b of the engagement member 4. The one end 4b of the engagement member is opposite the part 4a of the engagement member 4 which part 4a extends outside the housing 3 for contacting the member 7 to be picked up.

The lifting device 1 comprises cooperating guiding means 6, 9, 22, 23 for guiding the radial movement of the engagement member 4. The engagement member 4 is coupled with the body 2 and the housing 3. The engagement member 4 is moveably arranged through said cooperating guiding means 6, 9, 22, 23. The cooperating guiding means include a guide slot 22 and a guide pin 9. The guide slot 22 is integrally formed with the engagement member 4. The guide pin 9 is mounted with the housing 3. The guide pin 9 engages the guide slot 22 and constraints the movement of the engagement member 4. The engagement member 4 is coupled with the body 2 in a hingeable manner. The engagement member 4 is coupled with the body 2 with its one end 4b. The engagement member 4 is coupled with the body 2 through a hinge joint 23. The hinge joint 23 is supported by the body 2 through an outward flange 24 of the body 2. The cooperating guiding means 6, 9, 22, 23 thus constrain the movement of the engagement member 4 with respect to the mutual movement of the housing 3 and the body 2. When the body 2 is in an upper position as shown in FIG. 3, an open space 10 is left below the body 2.

The housing 3 is provided with guiding surfaces 6 for guiding the engagement member 4. In fact these guiding surfaces 6 do form a framework where the engagement member 4 extends through when the engagement member 4 moves between the radially outward position and the radially inward position. The guiding surfaces 6 are provided in the housing 3. The guiding surface 6a guides the engagement member 4 sidewards.

In this case, the lifting device 1 comprises a plurality of engagement members 4. The plurality of engagement members 4 is arranged around the central axis 20 for distributing a lifting force $F_L$ over a circumference of the lifting device 1.

The lifting device 1 comprises a gas spring device 5. The gas spring device 5 is coupled with the body 2 and the housing 3 for biasing the engagement member 4 towards its radially outward position.

The gas spring device 5 comprises a cylinder system 12, 13, 15 as can be seen in FIGS. 5a to 5c and 6a to 6c. The cylinder system 12, 13, 15 has a spring pressure chamber 13. The spring pressure chamber 13 contains a compressible fluid, like compressed nitrogen. The spring pressure chamber 13 biases the engagement member 4 towards its radially outward position. In this case, the spring pressure chamber 13 is arranged at a full bore side of the cylinder system 12, 13, 15.

The gas spring device 5 comprises a floating piston 15. The floating piston is arranged at an annular side of the cylinder system 12, 13, 15. The floating piston 15 delimits the spring pressure chamber 13. The gas spring device 5 comprises a leaking piston 12. The leaking piston 12 faces the full bore side of the cylinder system 12, 13, 15. The leaking piston 12 is coupled with a cylinder rod 16. The cylinder rod 16 is coupled with the housing 3. The body 2 is coupled with the housing 3 through the gas spring device 5. Here, the cylinder system 12, 13, 15 is integrated in the body 2.

The leaking piston 12 comprises a through hole 14 for allowing fluid to flow past the leaking piston 12. The leaking piston 12 and the floating piston 15 are configured such that when the floating piston 15 contacts the leaking piston 12, the floating piston 15 closes off the through hole 14. The floating piston 15 ensures that the spring action of the gas spring device 5 is possible in view of the compressible fluid in the spring pressure chamber 13 and the hydraulic fluid in the further pressure chamber 18 that is described below.

The cylinder system 12, 13, 15 comprises a further pressure chamber 18. The further pressure chamber 18 is arranged opposite the spring pressure chamber 13. The pressure chamber 18 contains an hydraulic fluid for retracting the cylinder rod 16 when pressurizing the hydraulic fluid. The pressurizing of the hydraulic fluid in the further pressure chamber in turn compresses the fluid in spring pressure chamber 13.

Figure 5A:
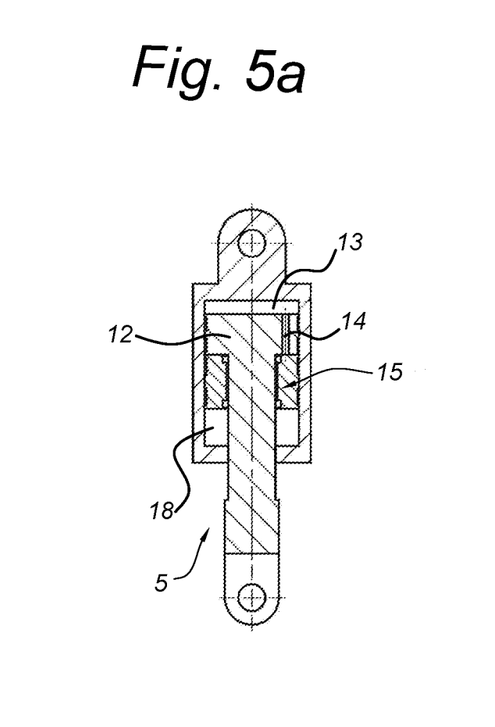
FIG. 5a-c a side view of a gas spring device of the lifting device of FIG. 1 in different positions.
Figure 5B:
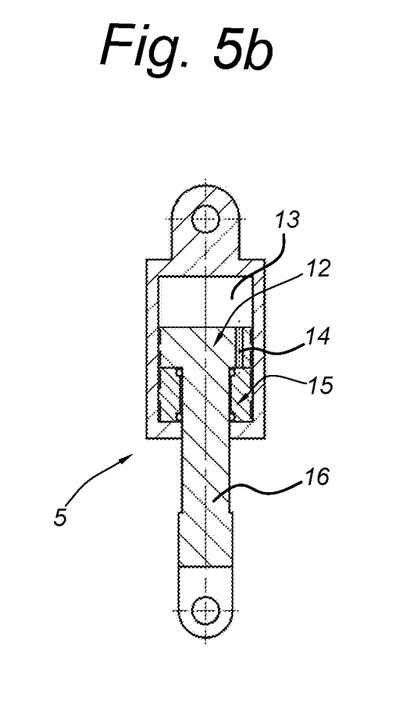
Figure 5C:
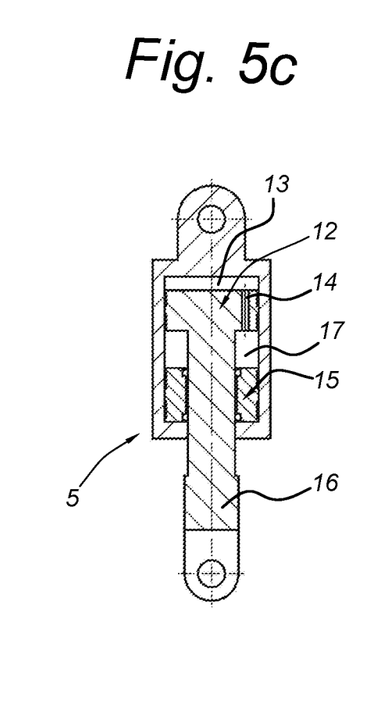

When retracting the leaking piston 12 by an external force, that means here not by pressurizing the hydraulic fluid, the floating piston 15 detaches from the leaking piston 12 and an in between chamber 17 is present as shown in FIG. 5a.

Figure 4A:
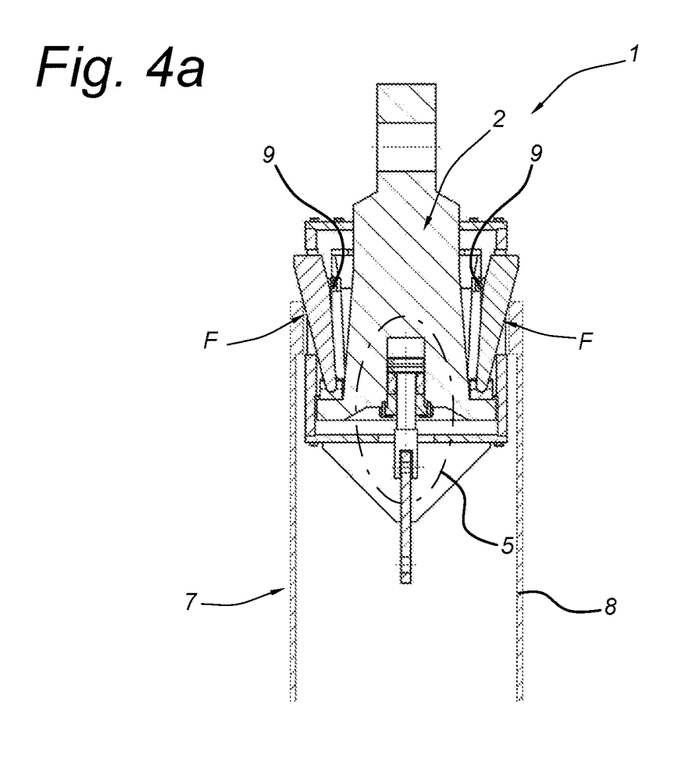
FIG. 4a-c the view of FIG. 1 when the lifting device contacts an object to be picked up.
Figure 4B:
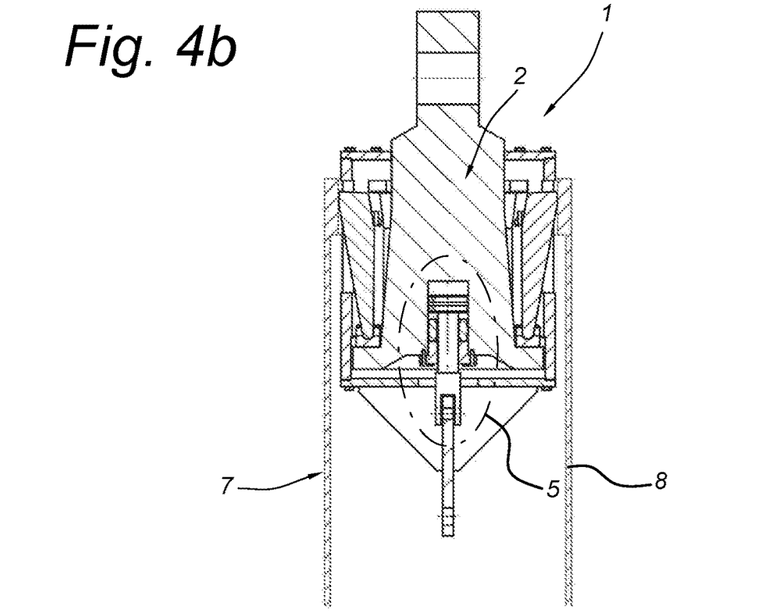
Figure 4C:
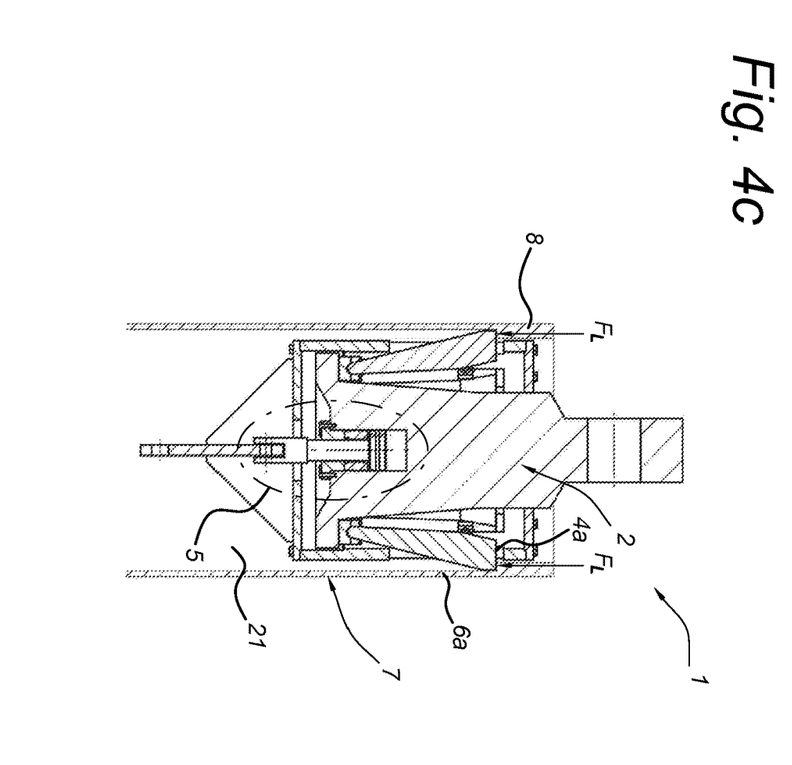

In FIG. 4a-c subsequent states of the lifting device 1 are shown when the lifting device 1 contacts an object 7 to be picked up. First, FIG. 4a, the lifting device contacts a pipe 7 provided with an internal flange 8. The pipe 7 supports the lifting device 1. The weight of the lifting tool 1 is supported through the engagement member 4. The Force F applied therefore on the engagement member 4 moves the engagement member 4 from its radially outward position shown towards its radially inward position, FIG. 4b. As a consequence the body 2 and the housing 3 start moving with respect to each other. Finally, when the engagement member 4 has passed the flange 8, the gas spring device 5 forces the engagement member 4 back towards its radially outward position. The engagement member 4 now contacts the flange 8 so that the lifting device can pick up the pipe 7. The engagement member 4 contacts the flange 8 through its part 4a that extends outside the housing 3.

Figure 7:
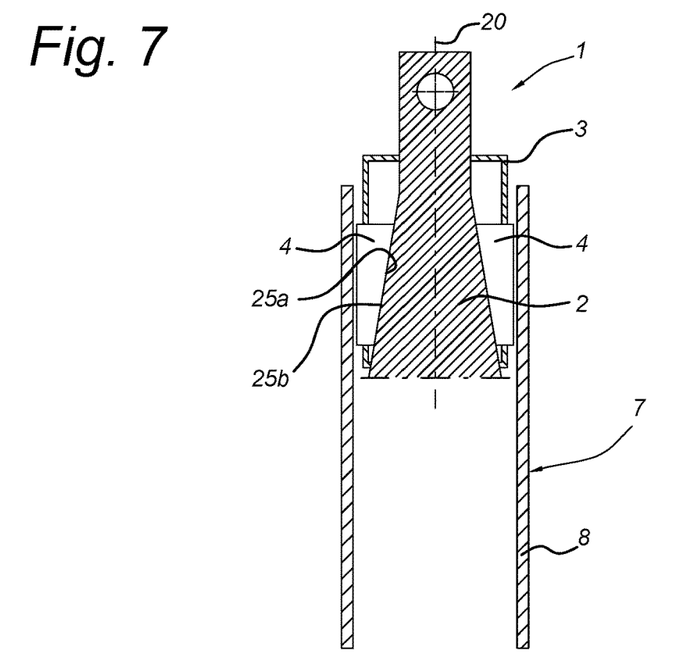
FIG. 7 shows a schematic cross sectional side view of a further embodiment of the lifting device according to the invention.

While FIG. 1-4 do show a flange lifting device, FIG. 7 shows a schematic cross sectional side view of a further embodiment of the lifting device 1 according to the invention. The lifting device 1 is schematically and only partly shown. In general only differences are described compared with the embodiment of FIG. 1-4. The lifting device 1 of FIG. 7 is an internal lifting device that engages the interior of the pipe 7 by friction between the engagement member 4 and the pipe wall 8.

The body 2 and the engagement member 4 comprise cooperating bevelled faces 25a, 25b to move the engagement member 4 by wedging action upon movement of the body 2 and the housing 3 with respect to each other.

Figure 8:
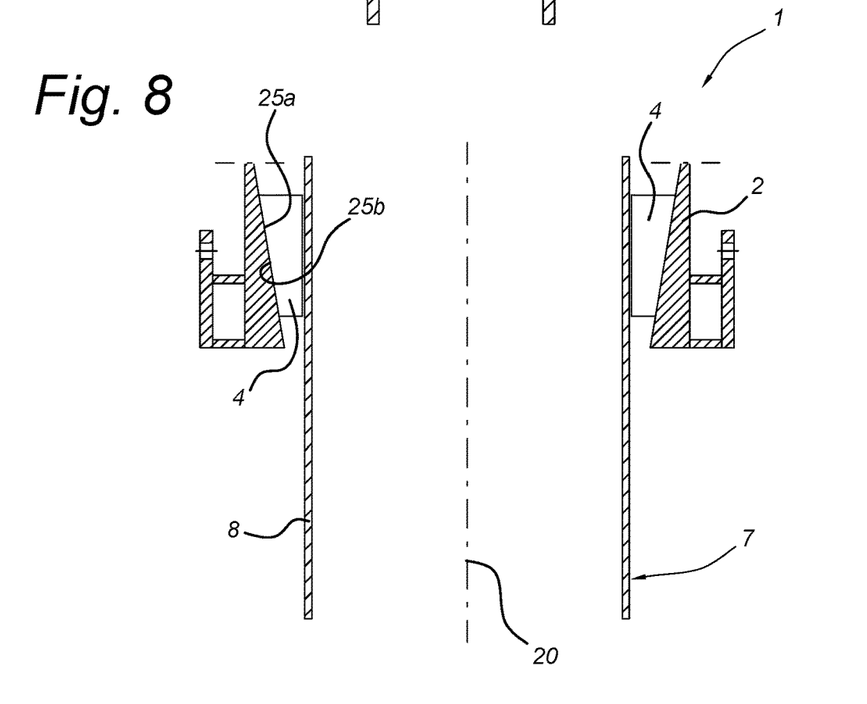
FIG. 8 shows a schematic cross sectional side view of an even further embodiment of the lifting device according to the invention.

FIG. 8 shows a schematic cross sectional side view of an even further embodiment of the lifting device 1 according to the invention. The lifting device 1 is schematically and only partly shown. In general only differences are described compared with the embodiment of FIG. 1-4. The lifting device 1 of FIG. 8 is an external lifting device that engages the exterior of the pipe 7 by friction between the engagement member 4 and the pipe wall 8. Again, the body 2 and the engagement member 4 comprise cooperating bevelled faces 25a, 25b to move the engagement member 4 by wedging action upon movement of the body 2 and the housing 3 with respect to each other.

It will also be obvious after the above description and drawings are included to illustrate some embodiments of the invention, and not to limit the scope of protection. Starting from this disclosure, many more embodiments will be evident to a skilled person which are within the scope of protection and the essence of this invention and which are obvious combinations of prior art techniques and the disclosure of this patent.

The invention claimed is:

1. A lifting device for picking up a member from the bottom of the sea, the lifting device comprising;
   a central body extending along a central axis of the lifting device and having means for connection to a hoist cable,
   a housing configured to be at least partially introduced into a cavity of the member to be picked up and accommodating at least a part of the body and wherein the body and the housing are moveable with respect to each other along the central axis of the lifting device,
   an engagement member, coupled with the body and the housing such that the engagement member is moveably arranged to move in a radial direction with respect to the central axis upon movement of the body and the housing with respect to each other, wherein the engagement member (4) is moveable between a radially outward position wherein at least a part of the engagement member extends outside the housing for contacting the member to be picked up, and a radially inward position wherein the engagement member is substantially accommodated within the housing such that the lifting device can be introduced in a cavity of the member to be picked up, and
   a gas spring device coupled with the body and the housing for biasing the engagement member towards its radially outward position.

2. The lifting device according to claim 1, comprising cooperating guiding means for guiding the radial movement of the engagement member, and wherein the engagement member is coupled with the body and the housing and moveably arranged through said cooperating guiding means.

3. The lifting device according to claim 2, wherein the cooperating guiding means comprise cooperating bevelled faces to move the engagement member by wedging action upon movement of the body and the housing with respect to each other.

4. The lifting device according to claim 2, wherein the cooperating guiding means comprise a guide slot and a guide pin engaging the guide slot.

5. The lifting device according to claim 4, wherein the guide slot is provided with the engagement member and the guide pin is provided with the housing.

6. The lifting device according to claim 2, wherein the cooperating guiding means comprise a guiding surface provided with the housing for guiding the engagement member when the engagement member moves between the radially outward position and the radially inward position.

7. The lifting device according to claim 1, wherein the engagement member is hingeably coupled with the body.

8. The lifting device according to claim 1, comprising a plurality of engagement members arranged around the central axis for distributing a lifting force over a circumference of the lifting device.

9. The lifting device according to claim 1, wherein the gas spring device comprises a cylinder system having a spring pressure chamber containing a compressible fluid for biasing the engagement member towards its radially outward position.

10. The lifting device according to claim 9, wherein the spring pressure chamber is arranged at a full bore side of the cylinder system.

11. The lifting device according to claim 9, wherein the gas spring device comprises a floating piston at an annular side of the cylinder system which floating piston delimits the spring pressure chamber, and a leaking piston facing the full bore side of the cylinder system, wherein the leaking piston is coupled with a cylinder rod.

12. The lifting device according to claim 11, wherein the leaking piston comprises a through hole for allowing fluid to flow past the leaking piston.

13. The lifting device according to claim 12, wherein the leaking piston and the floating piston are configured such that when the floating piston contacts the leaking piston, the floating piston closes off the through hole.

14. The lifting device according to claim 9, wherein the cylinder system comprises a further pressure chamber opposite the spring pressure chamber, which further pressure chamber contains an hydraulic fluid for retracting the cylinder rod when pressurizing the hydraulic fluid.

15. The lifting device according to claim 9, wherein the cylinder system is integrated in the body.

16. The lifting device according to claim 11, wherein the body and the housing are moveable with respect to each other along the central axis of the lifting device along a housing range of motion and the cylinder rod is provided with a stop for defining an end of the housing range of movement.

17. The lifting device according to claim 1, wherein the lifting device is one of a flange lifting tool, an internal lifting tool and an external lifting tool.

* * * * *